United States Patent
Bamji et al.

(10) Patent No.: US 7,408,627 B2
(45) Date of Patent: Aug. 5, 2008

(54) METHODS AND SYSTEM TO QUANTIFY DEPTH DATA ACCURACY IN THREE-DIMENSIONAL SENSORS USING SINGLE FRAME CAPTURE

(75) Inventors: Cyrus Bamji, Fremont, CA (US); Ilhami Torunoglu, Monte Sereno, CA (US); Salih Burak Gokturk, Mountain View, CA (US)

(73) Assignee: Canesta, Inc., Sunnyvale, CA (US)

( * ) Notice: Subject to any disclaimer, the term of this patent is extended or adjusted under 35 U.S.C. 154(b) by 363 days.

(21) Appl. No.: 11/348,737

(22) Filed: Feb. 6, 2006

(65) Prior Publication Data
US 2006/0197937 A1 Sep. 7, 2006

Related U.S. Application Data (60) Provisional application No. 60/650,917, filed on Feb. 8, 2005.

(51) Int. Cl.
*G01C 3/08* (2006.01)
(52) U.S. Cl. ...................... 356/5.01; 356/5.1
(58) Field of Classification Search ............. 356/4.01, 356/5.01, 5.1, 28
See application file for complete search history.

(56) References Cited

U.S. PATENT DOCUMENTS

| | | | | |
|---|---|---|---|---|
| 6,114,985 A | * | 9/2000 | Russell et al. | 342/169 |
| 6,580,496 B2 | * | 6/2003 | Bamji et al. | 356/5.1 |
| 6,833,909 B2 | * | 12/2004 | Schmidt et al. | 356/4.01 |
| 2005/0088641 A1 | * | 4/2005 | Hung et al. | 356/4.02 |

FOREIGN PATENT DOCUMENTS

WO   WO 2004017022 A1 * 2/2004

* cited by examiner

*Primary Examiner*—Isam Alsomiri
(74) *Attorney, Agent, or Firm*—Canesta, Inc.; Michael A. Kaufman (57) ABSTRACT

A method and system dynamically calculates confidence levels associated with accuracy of Z depth information obtained by a phase-shift time-of-flight (TOF) system that acquires consecutive images during an image frame. Knowledge of photodetector response to maximum and minimum detectable signals in active brightness and total brightness conditions is known a priori and stored. During system operation brightness threshold filtering and comparing with the a priori data permits identifying those photodetectors whose current output signals are of questionable confidence. A confidence map is dynamically generated and used to advise a user of the system that low confidence data is currently being generated. Parameter(s) other than brightness may also or instead be used.

20 Claims, 5 Drawing Sheets

FIG. 4B ness of the data, and to classify a confidence level for the data. Low confidence classified data can be so identified to a
METHODS AND SYSTEM TO QUANTIFY DEPTH DATA ACCURACY IN THREE-DIMENSIONAL SENSORS USING SINGLE FRAME CAPTURE

RELATION TO PENDING APPLICATIONS

Priority is claimed to U.S. provisional patent application Ser. No. 60/650,917 filed 8 Feb. 2005, entitled "Methods to Quantify the Depth Data Accuracy in 3-D Sensors Using Single Frame".

FIELD OF THE INVENTION

The invention relates generally to camera or range sensor systems including time-of-flight (TOF) sensor systems that capture scene brightness and time-of-flight depth distance Z in a single frame, and more particularly to using information acquired in a captured frame to quantify accuracy of the Z depth distance data and to classify a confidence level for the data. Low confidence classified data can be so identified to a user of the system.

BACKGROUND OF THE INVENTION

Electronic camera and range sensor systems that provide a measure of distance from the system to a target object are known in the art. Many such systems approximate the range to the target object based upon luminosity or brightness information obtained from the target object. However such systems may erroneously yield the same measurement information for a distant target object that happens to have a shiny surface and is thus highly reflective, as for a target object that is closer to the system but has a dull surface that is less reflective.

Figure 1:
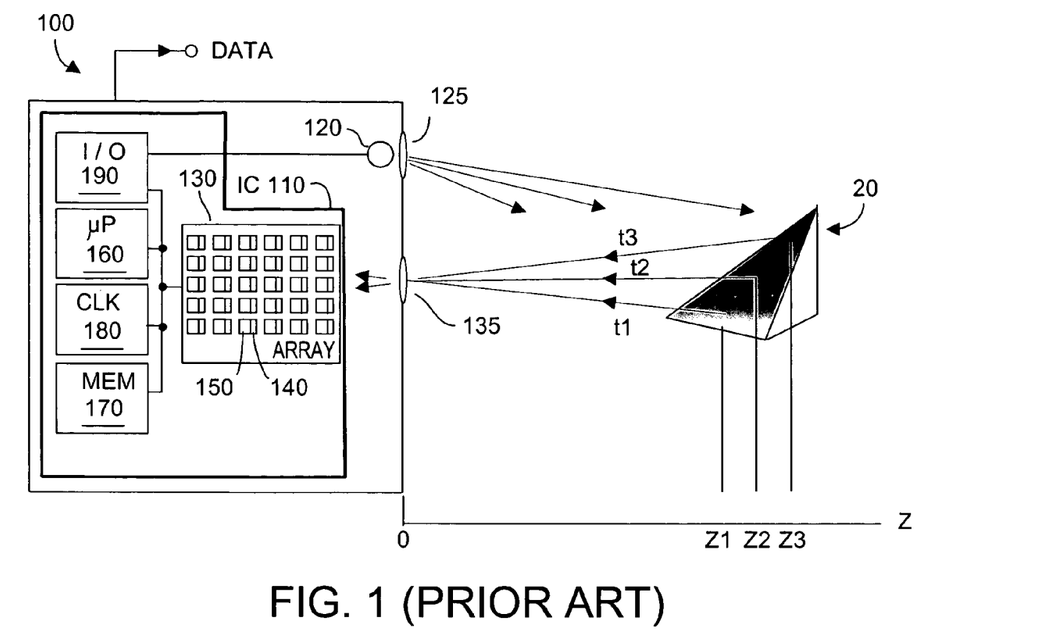
FIG. 1 is a block diagram depicting a time-of-flight three-dimensional imaging system as exemplified by U.S. Pat. No. 6,323,942, according to the prior art.

A more accurate distance measuring system is a so-called time-of-flight (TOF) system. FIG. 1 depicts an exemplary TOF system, as described in U.S. Pat. No. 6,323,942 entitled CMOS-Compatible Three-Dimensional Image Sensor IC (2001), which patent is incorporated herein by reference as further background material. TOF system 100 can be implemented on a single IC 110, without moving parts and with relatively few off-chip components. System 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 also includes a microprocessor or microcontroller unit 160, memory 170 (which preferably includes random access memory or RAM and read-only memory or ROM), a high speed distributable clock 180, and various computing and input/output (I/O) circuitry 190. I/O circuitry can provide functions including analog-to-digital conversion of detection signals, video gain, etc. Among other functions, controller unit 160 may perform distance to object and object velocity calculations.

Under control of microprocessor 160, a source of optical energy 120 is periodically energized and emits optical energy via lens 125 toward an object target 20. Typically the optical energy is light, for example emitted by a laser diode or LED device 120. Some of the emitted optical energy will be reflected off the surface of target object 20, and will pass through an aperture field stop and lens, collectively 135, and will fall upon two-dimensional array 130 of pixel detectors 140 where an image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined.

Emitted optical energy traversing to more distant surface regions of target object 20 before being reflected back toward system 100 will define a longer time-of-flight than radiation falling upon and being reflected from a nearer surface portion of the target object (or a closer target object). For example the time-of-flight for optical energy to traverse the roundtrip path noted at t1 is given by t1=2·Z1/C, where C is velocity of light. A TOF sensor system can acquire three-dimensional images of a target object in real time. Such systems advantageously can simultaneously acquire both luminosity data (e.g., signal amplitude) and true TOF distance measurements of a target object or scene.

As described in U.S. Pat. No. 6,323,942, in one embodiment of system 100 each pixel detector 140 has an associated high speed counter that accumulates clock pulses in a number directly proportional to TOF for a system-emitted pulse to reflect from an object point and be detected by a pixel detector focused upon that point. The TOF data provides a direct digital measure of distance from the particular pixel to a point on the object reflecting the emitted pulse of optical energy. In a second embodiment, in lieu of high speed clock circuits, each pixel detector 140 is provided with a charge accumulator and an electronic shutter. The shutters are opened when a pulse of optical energy is emitted, and closed thereafter such that each pixel detector accumulates charge as a function of return photon energy falling upon the associated pixel detector. The amount of accumulated charge provides a direct measure of round-trip TOF. In either embodiment, TOF data permits reconstruction of the three-dimensional topography of the light-reflecting surface of the object being imaged. While systems described in U.S. Pat. No. 6,323,942 can acquired Z information, the accuracy of such information is not known on a per frame of acquired data basis.

Figure 2A:
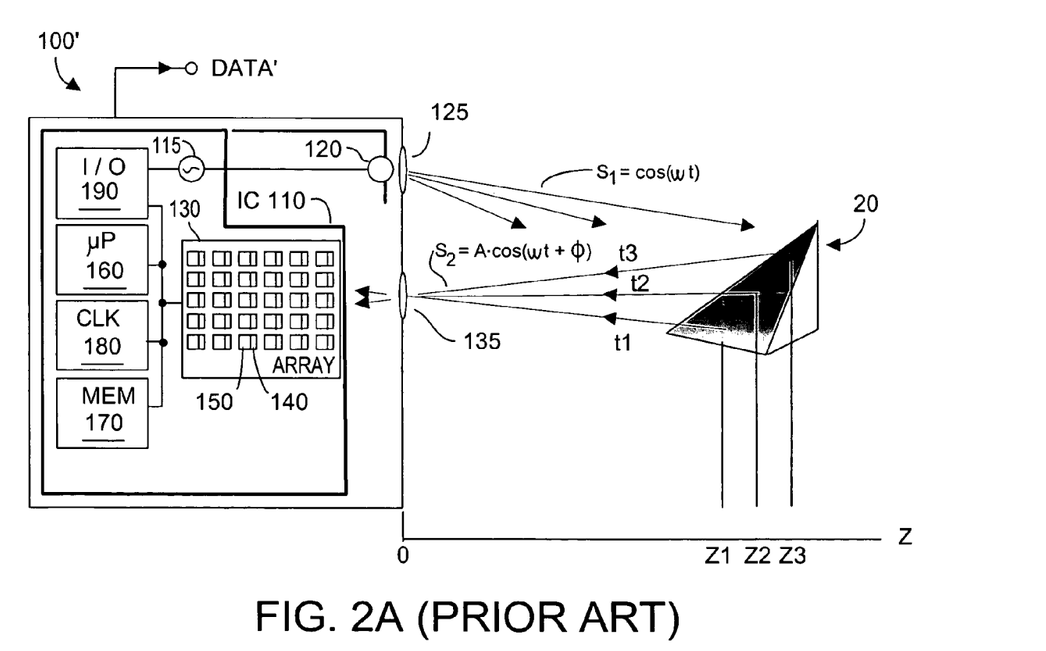
FIG. 2A is a block diagram depicting a phase-shift three-dimensional imaging system as exemplified by U.S. Pat. No. 6,515,740 and U.S. Pat. No. 6,580,496, according to the prior art.

Some systems determine TOF by examining relative phase shift between the transmitted light signals and signals reflected from the target object. Detection of the reflected light signals over multiple locations in a pixel array results in measurement signals that are referred to as depth images. U.S. Pat. Nos. 6,515,740 (2003) and 6,580,496 (2003) disclose respectively Methods and Systems for CMOS-Compatible Three-Dimensional Imaging Sensing Using Quantum Efficiency Modulation. FIG. 2A depicts an exemplary phase-shift detection system 100' according to U.S. Pat. No. 6,515,740 and U.S. Pat. No. 6,580,496. Unless otherwise stated, reference numerals in FIG. 2A may be understood to refer to elements identical to what has been described with respect to the TOF system of FIG. 1.

In FIG. 2A, an exciter 115 drives emitter 120 with a preferably low power (e.g., perhaps 50 mW peak) periodic waveform, producing optical energy emissions of known frequency (perhaps a few hundred MHz) for a time period known as the shutter time (perhaps 10 ms). Energy from emitter 120 and detected signals within pixel detectors 140 are synchronous to each other such that phase difference and thus distance Z can be measured for each pixel detector.

Figure 2B:
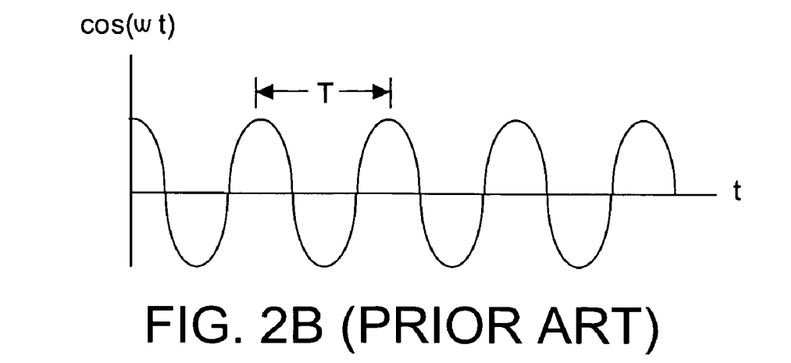
FIGS. 2B, 2C, 2D depict exemplary waveform relationships for the block diagram of FIG. 2A, according to the prior art.
Figure 2C:
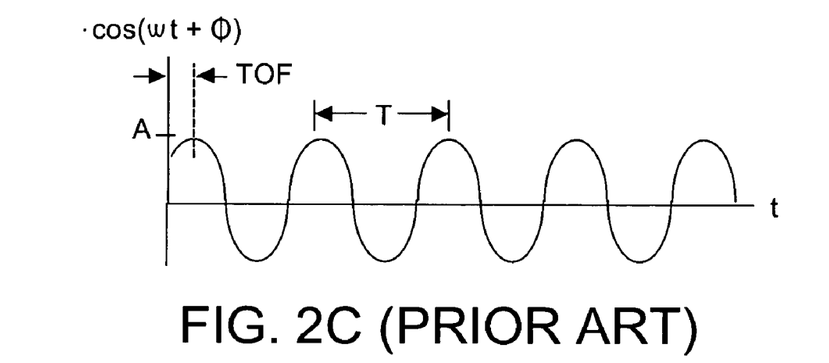
Figure 2D:
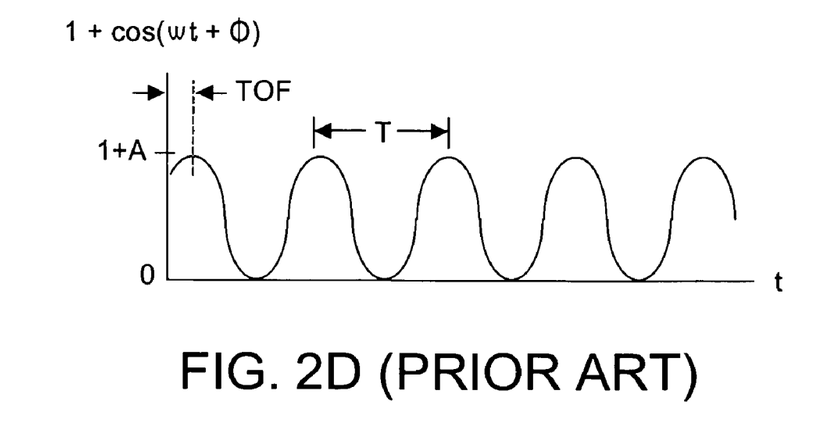

The optical energy detected by the two-dimensional imaging sensor array 130 will include amplitude or intensity information, denoted as "A", as well as phase shift information, denoted as $\phi$. As depicted in exemplary waveforms in FIGS. 2B, 2C, 2D, the phase shift information varies with distance Z and can be processed to yield Z data. For each pulse or burst of optical energy transmitted by emitter 120, a three-dimensional image of the visible portion of target object 20 is acquired, from which intensity and Z data is obtained (DATA'). As described in U.S. Pat. Nos. 6,515,740 and 6,580,496 obtain depth information Z requires acquiring at least two samples of the target object (or scene) 20 with 90° phase shift between emitted optical energy and the pixel detected signals. While two samples is a minimum figures, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data. Further details as to implementation of various embodiments of phase shift systems may be found in U.S. Pat. Nos. 6,515,740 and 6,580,496. However while the systems and methods described in these two patents can acquire Z information, accuracy of the acquired Z information is not known on a per frame basis.

Many factors, including ambient light, can affect reliability of data acquired by TOF systems. The depth accuracy of Z-data information acquired by pixel detectors 140 in array 130 will vary with the amount of optical energy incident on the pixel detector. In extreme cases there can be too little reflected optical energy, for example from dark target objects 20, perhaps black motor vehicle tires, dark clothing on a pedestrian, etc. On the other hand, an overly reflective target object 20 can reflect too much optical energy. An excess of incoming optical energy can saturate the pixel detector, with the result that the Z-data indicates that the target object 20 moved. However the data alone cannot be used to discern whether the target object 20 actually moved, or whether pixel detector saturation has produced erroneous Z-data indicative of movement, when in fact there was no movement. In these and other extreme cases, the Z-data provided by the TOF system can include incorrect depth information. But while the information is incorrect, the prior art provides no mechanism to so identify the questionable Z-data.

As a result, in an attempt to reduce errors, in some TOF systems the transmitted optical energy may be emitted multiple times using different systems settings to increase reliability of the acquired TOF measurements. For example, the initial phase of the emitted optical energy might be varied to cope with various ambient and reflectivity conditions. The amplitude of the emitted energy might be varied to increase system dynamic range. The exposure duration of the emitted optical energy may be varied to increase dynamic range of the system. Further, frequency of the emitted optical energy may be varied to improve the unambiguous range of the system measurements.

In practice, TOF systems may combine multiple measurements to arrive at a final depth image. But if there is relative motion between system 100 or 100' and target object 20 while the measurements are being made, the TOF data and final depth image can be degraded by so-called motion blur. For example, while acquiring TOF measurements, system 100 may move, and/or target object 20 may move, or may comprise a scene that include motion. If shutter time is 10 ms (25 frames/second), relative motion occurring faster than about $\frac{1}{40}$ ms (for a four-sample acquisition) will produce motion blur. As a result, the motion blur will cause erroneous distance Z data, and will yield a depth image with errors. Unfortunately prior art systems do not provide a mechanism to alert the end user of the Z data that the data being processed at any given time may be relatively low confidence data, e.g., data that perhaps should not be relied upon unduly.

Various other patents have provided methods and systems to improve performance of TOF systems. For example, U.S. Pat. No. 6,522,395 entitled Noise Reduction Techniques Suitable for Three-Dimensional Information Acquirable with CMOS-Compatible Image Sensor ICs (2003) is directed to improving noise reduction in time-of-flight systems by integrating the photodetected brightness signal until integration reaches a predetermined threshold level. The system provides a corrected TOF measurement equal to the round-trip time from system to target object plus an additional time needed for the integrated photodetector signal to cross the threshold value, less a constant times the ratio of photodetector signal amplitude after integration over time equal to pulse width of the emitted optical signal, divided by the pulse width duration. U.S. Pat. No. 6,674,895 entitled Methods for Enhancing Performance and Data Acquired from Three-Dimensional Image Systems (2004), and U.S. Pat. No. 6,512,838 entitled Methods for Enhancing Performance and Data Acquired from Three-Dimensional Image Systems (2003) are directed to a time-of-flight system in which accuracy and resolution are enhanced by various techniques including over-sampling the acquired photodetector data and forming running averages with the data. Acquired data may be rejected certain criteria are not met. However TOF systems according to these patents do not per se identify questionable or low confidence data to a user of the system.

Figure 3A:
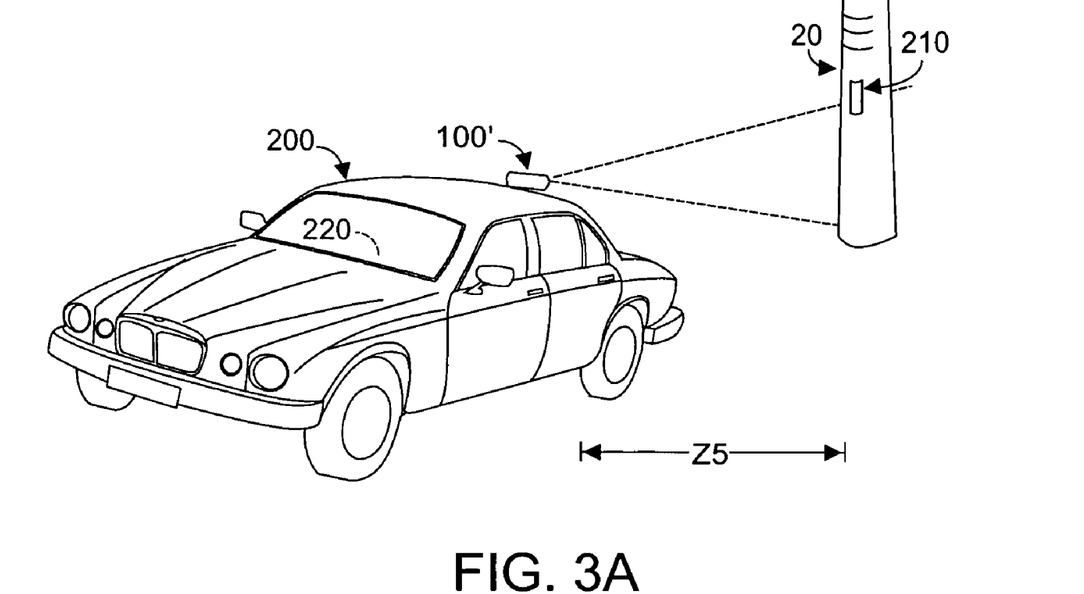
FIG. 3A depicts a rear-viewing imaging system installed in a motor vehicle with a driver-viewable display, according to the prior art.
Figure 3B:
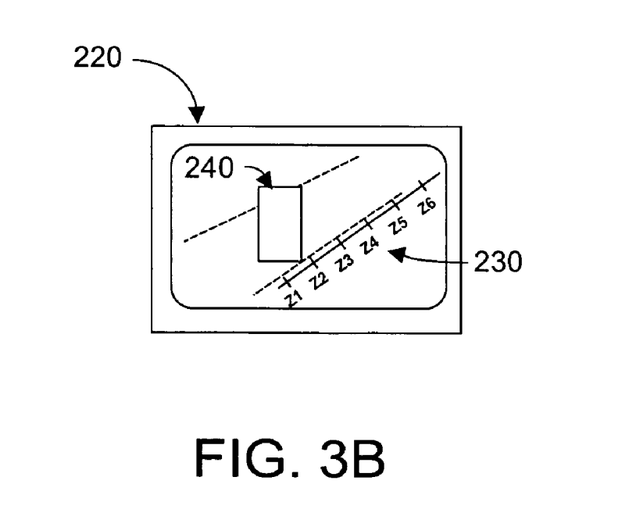
FIG. 3B depicts an erroneous Z-distance image on the driver-viewable display resulting from the system shown in FIG. 3A, according to the prior art.

Applications for TOF systems can vary, from systems used to implement virtual input devices such as a keyboard (e.g., see U.S. Pat. No. 6,614,422, U.S. Pat. No. 6,710,770), for which Z measurements are over a fairly small range of distance, to vehicular or security or robotic type systems for which the range of applicable Z measurements may be many meters. By way of example, FIG. 3A depicts a prior art system such as 100' mounted so as to provide the operator of a motor vehicle 200 with information as to Z distance to objects 20 behind the vehicle. Assume that vehicle 200 is backing up, generally towards object 20. System 100' can obtain Z data and can provide the processed information to an operator-viewable monitor 220. As shown in FIG. 3B, monitor 220 can provide a display 230 with a representation 240 as to Z distance to any proximate target objects. But assume that the target object 20 in FIG. 3A is surrounded by a highly reflective region 210, perhaps a puddle of water. Thus although the actual distance from the rear of vehicle 200 where system 100' is located to the target object 20 is distance Z5, perhaps due to the reflectivity of the water, the displayed information 240 erroneously reports a smaller distance, here approximately Z1.

Unfortunately although the information being displayed in FIG. 3B is the result of low confidence data, the operator of vehicle 200 has no indication of this infirmity in the data. If system 100' is allowed to automatically apply the brakes to vehicle 200 when distance Z to a perceived object is too short, perhaps Z<Z2, vehicle 200 will brake needlessly, since the true distance is Z5. A worse case would be where system 100' erroneously reports the distance to a target object 20 as being greater than the true distance. In such case, since the vehicle operator has no knowledge that the data is questionable, vehicle 200 might continue to back-up until it collides with the target object.

While FIGS. 3A and 3B depict a rear-viewing application of a TOF system 100', understandably there are other applications, for example robotic systems in a factor, where errors in Z data are very undesirable, especially where the users of the system do not know that erroneous data may be generated.

To recapitulate, prior art TOF systems can, for a variety of reasons, generate erroneous Z-data depth information. Regardless of the TOF application, the Z-data that is acquired cannot by itself be used to determine whether the data is worthy of full confidence. For example, Z data erroneously indicating target object movement from a saturated pixel detector is indistinguishable from Z-data properly indicating target object movement. TOF systems subject to such unidentified ambiguity in the Z-data are adversely affected. Further, in applications such as tracking a target object within a scene, the accuracy of the depth information of each pixel detector in each frame is to be known to identify which pixels to use in calculations.

Unfortunately prior art statistical methods such as spatial standard deviation, which use depth values in neighboring pixel detectors to estimate the depth accuracy, or prior art temporal standards, which use past depth measurements to estimate the depth accuracy, cannot be used to provide assistance. This is because these prior art methods assume that the mean value of the depth, i.e. position of the object(s), does not change. Unfortunately this unchanging positional requirement cannot be achieved in dynamic scenes.

There is a need for a method and system that take into account both accuracy-type positional errors and uncertainty-type positional errors that can exist in a TOF system. Such method and system should detect and identify erroneous or low confidence Z data generated by a TOF system, and quantify accuracy of the acquired depth values in terms of confidence. Preferably such method and system should require no further data than is already acquired by the TOF system.

The present invention provides such a method and system.

SUMMARY OF THE PRESENT INVENTION

The present invention provides a method and system using data already acquired by a TOF system to identify pixel detector saturation and low ambient light conditions, and to quantify the depth accuracy of the generated Z data. In one embodiment, brightness information (A) acquired by the pixel detector preferably is used as an environmental system parameter.

Phase shift TOF systems such as that depicted in FIG. 2A can produce on a per frame basis depth information (distance Z data), and two types of brightness information (total brightness and active brightness). As used herein, total brightness refers to the total optical energy received by a pixel detector 140, which is to say reflected optical energy originally output by emitter 120, and ambient optical energy, sunlight or room lighting for example. As used herein, active brightness refers to the total optical energy produced solely by reflected energy originally output by emitter 120.

The present invention recognizes that a TOF system introduces two types of positional error. One type of positional error is a somewhat static error in accuracy, e.g., the difference between the real coordinates of the target object that receives and then reflects optical energy to a photodetector pixel, and a somewhat massively time averaged reading for that photodetector pixel. A second type of positional error is error or uncertainty in the z-depth, which error depends on the illumination received for the pixel detector in question, both from the laser light source and ambient light.

In one embodiment, confidence at each pixel detector is characterized as a combination, for example an RMS sum, of accuracy and uncertainty, where accuracy is somewhat static. Confidence may then be approximated by considering so-called radial uncertainty at a particular pixel detector as a function of illumination, both from the TOF emitted optical energy and from ambient optical energy. When a pixel detector is operated within its dynamic range, e.g., neither too much nor too little incoming optical energy to be detected, depth uncertainty positional error may be approximated as the product of a constant scaling factor and the signal/noise ratio for the pixel detector of interest. Conversely when a pixel detector is determined to be operating out of its normal dynamic range, a signal/noise ratio of zero, and a confidence level of zero is assumed for data from that pixel detector.

In one embodiment, the present invention provides a brightness-based threshold filter to detect low light levels and saturated light levels in the system photodetectors. Characteristics of the pixel detectors in the pixel array are known a priori. In operation, the threshold filter is used with total brightness and with average brightness data to detect both low light and saturation detector conditions, preferably on a per frame basis. Dynamically, threshold filtering enables identification of pixel detectors that do not perform well at given pixel output brightness levels. So identified, Z depth output data from pixels whose output is believed questionable are indicated as being unreliable. The system thus outputs Z depth data, some of which is marked as being highly unreliable, questionably unreliable, or potentially unreliable. Z-depth data not so identified is presumed to be reliable. Images constructed from the Z-depth data can thus include regions markable as being less than reliable. Alternatively or in addition, the system can note the presence of questionable Z-depth data using acoustic warnings. On the other hand, highly reliable sensor data need not be marked, and may confidently be used to control sub-systems in another system, for example to sound the horn in a motor vehicle if the sensor system detects an object may be collided with. In a rearward moving motor vehicle, highly reliable sensor data may be used to automatically apply the vehicle brakes to avoid colliding with a sensed object behind the vehicle.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 4A:
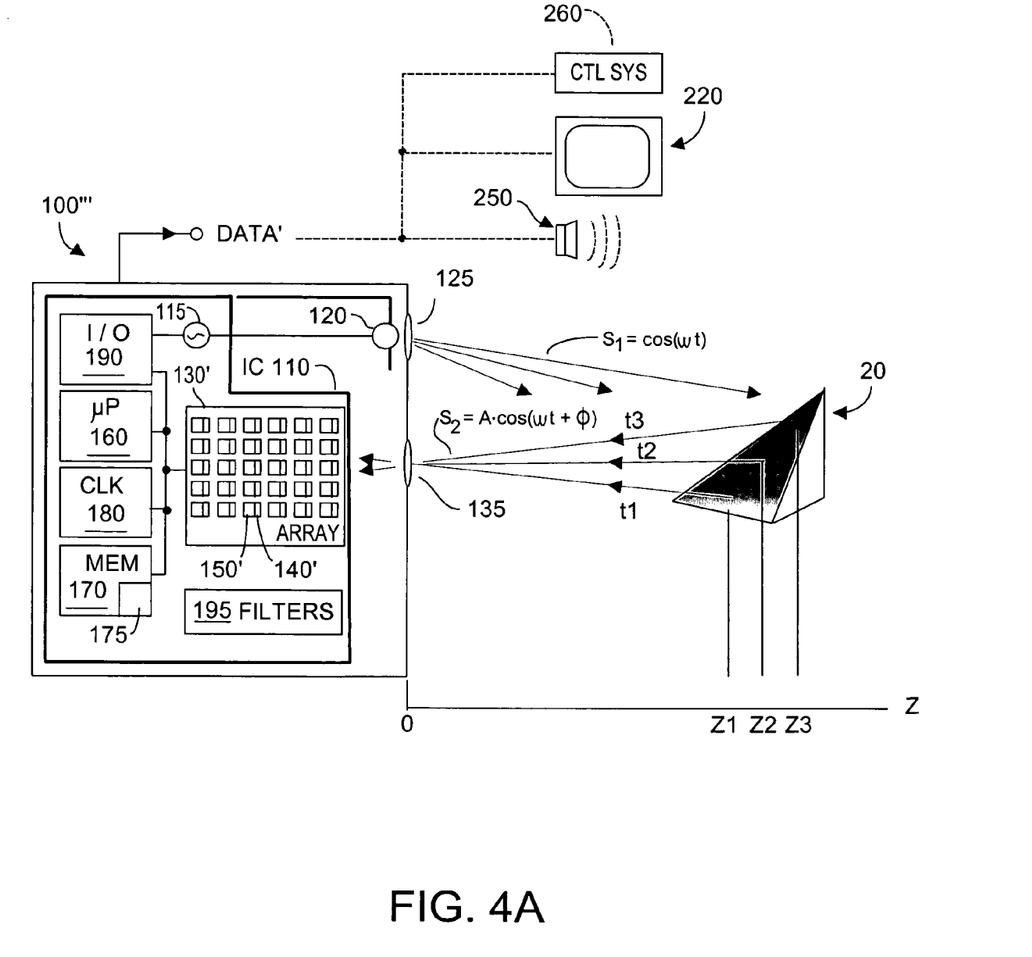
FIG. 4A depicts a phase-shift three-dimensional imaging system TOF system employing data confidence mapping, according to the present invention.

FIG. 4A depicts a phase-shift system 100''' with software routine 175 and threshold filtering system 195, according to the present invention. Upon execution, software routine 175 caries out the present invention. Software routine 175 may be stored in a portion of memory 170 and may be executed by microprocessor unit 160. System 100''' operates so as to quantify accuracy of the Z or depth data acquired by the three-dimensional sensor array 130'. Output from system 100''' may be used to create a user-visible display 220 and/or to enable an acoustic warning device 250, and/or to command operation of external control systems 260. Unless otherwise stated, reference numerals in FIG. 4A may be understood to refer to elements identical to what has been described with respect to system 100'' in FIG. 2A. As such, it is understood that the various embodiments of system 100'' described below may be fabricated using CMOS technology upon a common integrated circuit substrate.

As noted, pixel photodetectors 140' (sometimes referred to herein as pixels) in array 130' are expected to output useful detection signals, regardless of whether magnitude of incoming optical energy is low (for example a distant and/or non-reflective target object 20), or extremely high, due perhaps to high ambient light, e.g., sunlight, or a highly reflective target object. Sufficiently high levels of ambient light can saturate pixel detectors 140', whose output signal may be large in amplitude but will likely be erroneous. Typically data generated at these two extremes of very low optical energy and very high optical energy will be erroneous and will be termed low-confidence data.

But low confidence data are not identifiable from the three-dimensional depth information alone. Such information alone cannot determine whether a pixel detector has saturated, in which case the target object may erroneously appear to have moved to a new location, or whether indeed the target object truly moved. By contrast, according to the present invention, system 100''' examines information already gathered by sensor array 140' during a frame of captured data. System 100''' uses this gathered information to quantify the depth data accuracy (e.g., Z-measurements). If system 100''' determines that Z data presently being detected are low in confidence, this low confidence level can be identified to users of the system, for example via display 220 and/or acoustic device 250.

The present invention recognizes that there are two kinds of positional errors introduced by a time of flight system: accuracy and depth uncertainty.

Accuracy positional error is the difference between the real coordinates of the target object that receives and then reflects optical energy to a photodetector pixel, and a somewhat massively time averaged reading for that photodetector pixel. This positional accuracy error can be characterized as an RMS deviation between the photodetector pixel reading and the real coordinates for the target object portion being read. This quantity is typically specified for each photodetector pixel along each of the x-axis, y-axis, and z-axis. Accuracy positional error is generally a static quality that is independent of illumination although it may vary slightly with environmental ambient. Accuracy is usually a function of how well the system calibration has been performed for the pixel detector in question. Accuracy also depends on lens distortion and calibration for the pixel detector in question.

Uncertainty positional error is uncertainty in the z-depth. Uncertainty depends on the illumination received for the pixel detector in question, both from the laser light source and ambient light. This error is the time based RMS of the variations in the readings from that pixel. Depth uncertainty can typically be characterized by a single number for each pixel detector, that corresponds to the uncertainty principally along the radial axis for the pixel detector of interest, assuming that the light source and pixel detector are at the same location. The depth uncertainty value along the radial line can then be projected along each axis.

In one embodiment, confidence at each pixel detector is characterized as the combination, for example an RMS sum, of accuracy and uncertainty. As accuracy is somewhat of a static quality, embodiments of the present invention are generally directed to how to obtain the radial uncertainty at a particular pixel detector as a function of illumination.

When operating in a correct pixel detector operating dynamic range, e.g., the pixel detector is received neither too much nor too little light to be detected, uncertainty may be modeled as:

Uncertainty=(Constant_scaling_factor)·(signal/noise)

With pixel detector array 130; the signal for a particular pixel detector 140 at a particular frame of acquired data may be assumed to be the laser brightness also called active brightness for that pixel and frame, where optical energy source 120 is the source of such brightness:

$$\text{Signal=Active\_Brightness=} \sqrt{(\Delta 0°-\Delta 180°)^2+(\Delta 90°-\Delta 270°)^2}$$

where 0°, 180°, 90°, 270° refer to phase-shifts at which the data are acquired by the pixel detector 140' of interest.

Noise comes from many sources including shot noise, quantization noise associated with analog-to-digital conversion (A/D), which noise contribution is a fixed quantity dependent upon the A/D converters, and analog noise in IC chip 110, comprising thermal noise, and flicker noise, among other contributors.

Shot noise is noise from total illumination, e.g., illumination from active source 120 plus ambient optical energy as measured by the TOF pixel detector of interest. Shot noise may be modeled as:

$$\text{shot noise=}\sqrt{\text{activelight+ambientlight}}$$

Total noise can then be modeled as the RMS sum of the noise components as follows:

$$\text{total noise=}\sqrt{(\text{shotnoise})^2+(A/D\text{quantizationnoise})^2+(\text{analognoise})^2+...}$$

Again it is assumed in the above that the pixel detector(s) of interest are operating within their dynamic range in terms of levels of active and ambient light falling upon the detector(s). Thus, system 100''' will first confirm that the pixel detector(s) of interest are not receiving inadequate or excessive levels of optical energy. For purposes of the present invention, such confirmation can simply ensure that both active brightness and ambient light levels are below a certain maximum threshold level for each quantity. If active brightness and ambient light levels are determined not to be within reasonable bounds, an embodiment of the present invention will assume the signal/noise ratio is zero. A signal/noise ratio of zero corresponds to a confidence level of 0 for the data.

Determination of confidence levels can also take into account motion-related considerations. For example, the level of confidence may be decremented if ambient light or object motion is detected at a given pixel detector.

Figure 4B:
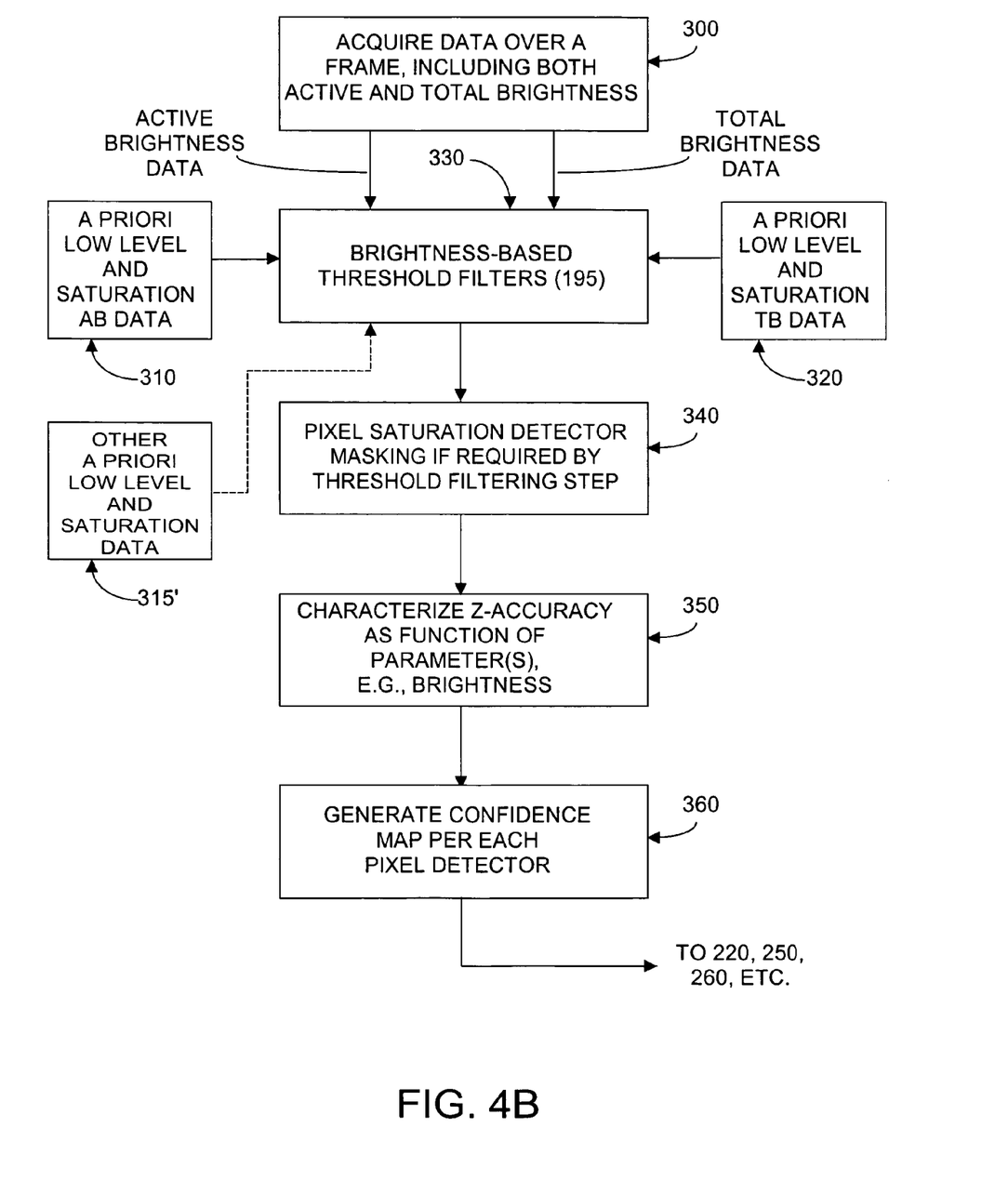
FIG. 4B depicts exemplary method steps implementing confidence mapping in a system such as shown in FIG. 4A, according to the present invention.

FIG. 4B is an exemplary flow chart showing method steps implementing an exemplary embodiment of the present invention. With reference to FIG. 4A, it is understood that these method steps represent operations carried out by software routine 175 upon execution, for example by microprocessor 160, or other processor unit. Threshold filters 195 may in fact be implemented in software, although hardware could also or instead be used.

Referring to FIGS. 4A and 4B, at method step 300 system 100''' acquires data over a time frame, perhaps 10 ms in duration, which data includes both active brightness data and total brightness data. Phase measurement information obtained from photodetectors 140' will include Z depth information as well as information as to the brightness or amplitude of the detected optical energy.

As used herein, "total brightness" refers to the brightness or amplitude of signals detected by photodetectors 140' responsive to the total optical energy falling upon array 130', e.g., optical energy components comprising both ambient light and the desired optical energy reflected by target object 20 some distance Z away due to optical energy emitted by source 120. The term "active brightness" refers to the brightness or amplitude of detected signals responsive solely to optical energy reflected by target object 20 due to optical energy emitted by source 120. Under control of microprocessor 160, system 100''' can obtain a measure of ambient light only by detecting incoming optical energy at a time when source 120 has not emitted detectable optical energy. Such "ambient only" response can be subtracted by system 100''' from the "total brightness" response to yield the "active brightness" response. Method step 300 represents the gathering of the active brightness data and the total brightness data by system 100'''. It will be appreciated that total brightness data and active brightness data are each simultaneously available from photodetectors 140'.

In an off-line run, perhaps conducted when system 100''' is manufactured, each photodetector 140' is subjected to very low levels of optical energy to determine a minimum detectable signal level, under total brightness ("TB") and under active brightness ("AB") conditions. Each photodetector 140' is also subjected to very high levels of optical energy to determine a saturation detection signal level, again under TB and AB conditions. These AB data and TB data are gathered and stored, for example in memory 170 for each photodetector 140'. The stored such AB data and TB data are shown in method steps 310 and 320.

Shown as method step 330 is one or more brightness-based threshold filters 195. Filter(s) 195 may be implemented in software and/or hardware, and serve to compare known upper and lower values of AB and DB data from steps 310, 320 with AB data and TB data now being generated by photodetectors 140'. Filter(s) 195 serve to identify which, if any, photodetectors 140' are at this moment operating either at too low or too high a level of incoming optical energy to output Z depth information that can be relied upon with confidence.

For example, suppose that output from each photodetector is quantized to one of say 255 levels. Perhaps output levels 0 through 10 could be defined as representing extremely low levels of optical energy, to low to be confidently relied upon. On the other hand, photodetector output levels 245 through 255 could represent high levels of optical energy that saturate the photodetector such that its output cannot confidently be relied upon.

At method step 330, brightness-based threshold filter(s) 195 carry out the above comparisons, preferably on a per photodetector basis. At method step 340, photodetectors 140' whose output signals fall within questionable regions indicating too low or too high levels of incoming optical energy to be reliably detected may be masked out for the current frame of acquired Z depth data.

At method step 350, the remaining photodetectors (e.g., those whose present output levels are believed to be good and associated with input optical energy levels in a confidently detectable range) may have their presumably good Z depth data characterized as a function of parameters of interest, for example brightness. This process yields what may be deemed a two-dimensional confidence map, as indicated by method step 360, which map may be stored in memory 170.

As regards the confidence map, if the total range of brightness levels is quantized to one of 255 levels, non-masked photodetectors whose outputs are mid-range, perhaps 113 to 133, may be characterized as being highest confidence data, whereas non-masked photodetectors whose outputs lie closer to the presumed boundaries of good data, perhaps 11-20, and 235-245, could be characterized as being less confident data, and so forth. Detected Z depth values output by individual photodetectors may then be associated with the current confidence level for that photodetector for the current frame of acquired data. Thus, unacceptably out-of-range Z depth data may be masked out as being without sufficient confidence for use. Z depth data that is believed to be of highest confidence may be so marked, Z depth date of intermediate confidence may be so marked, and so on.

By way of example, assume that the functional relationship (f) between accuracy and brightness is given by:

$$\text{accuracy (brightness)} = f(\text{brightness})$$

The assigned confidence (or depth accuracy) measure for each photodetector will be a function (g) of the accuracy function:

$$\text{confidence(brightness)} = g((\text{accuracy(brightness)})).$$

Following execution of method step 360, confidence map information may be communicated to an end user of system 100''' in a number of ways. Compare for example prior art system 100' (FIG. 3A) and its use of output data (FIG. 3B) with system 100''' FIG. 4A and its use of output data according to the present invention. In prior art system 100', acquired Z depth data was used but without alerting the end-user to potential problems with the data. For example the data may have been generated under system conditions not conducive to high confidence in the data, e.g., perhaps incoming optical energy levels were too low or too high to be relied upon, and/or system operating potential may have been out of specification such that resultant data was not reliable, etc. If system 100''' in FIG. 4A represents a vehicle imaging application, knowledge that currently generated data is high confidence may be used to permit system 100''' to automatically command control system 260. For example, control system 260 may be the braking system in a vehicle that is presently moving towards collision with an object 20, whose presence is confidently detected by system 100''' as comprising a threat. Alternatively control system 260 might be the vehicle's warning horn, warning lights, perhaps even a steering wheel override in a truly emergency scenario. Such automatic control would be essentially unthinkable with a prior art TOF system 100 for which there was no known level of confidence in the Z depth information currently being generated.

But in FIG. 4A, system 100''' (which may be mounted on the rear of a vehicle) includes confidence mapping according to the present invention. If an output from system 100''' includes a user-viewable display 220, representations on the display associated with low confidence data may be so indicated, for example with indicia such as question mark(s), and/or graying-out of questionable regions of the image, and/or displaying questionable regions in a different color, and/or flashing questionable regions on and off, etc. In certain critical applications, perhaps robotic applications, it may be desired to indicate very high confidence data as well, perhaps with a contour map surrounding the regions of high confidence. Output from system 100''' may comprise or include transducer 250 generated user-audible signals, perhaps an enunciated message that literally states "alert, alert, low confidence data is being generated right now". Alternatively a user-audible signal might include a warning tone known to indicate low confidence data is currently being generated. It is understood that system 100''' may indicate when low (or very high) confidence data is being used in other and additional ways, and that what has been described above is meant to be exemplary.

It will be appreciated that the above-described procedure is preferably calculated on-the-fly and can dynamically improve use of the Z depth data generated from output from the various photodetectors 140'. Note too that other environmental parameters may also be represented by threshold filtering, as indicated by optional method step 315'. For example, as ambient temperature changes, individual photodetectors within array 130' may vary in their ability to output detection signals. A priori low and high temperature value output signals for each photodetector may be obtained offline and stored. If during actual operation of system 100''' it is noted that ambient temperature is currently at a level known to affect photodetector outputs, those outputs from photodetectors known to be susceptible to the current temperature regime may have their Z depth outputs masked or marked as being unacceptably low in confidence value for use, or useable but with somewhat questionable confidence, and so forth. Note too that system parameters other than temperature could also, or instead, be used, e.g., system power supply level, system altitude, system atmospheric pressure, system humidity, etc. Regardless of the parameter(s) used, the present invention permits recalculating confidence and accuracy functions on-the-fly so as to dynamically fine-tune system 100''' to the task at hand. In some applications it may suffice to have little or no indication of low confidence data, while in other applications, dynamically fine-tuning system 100''' may be required.

Modifications and variations may be made to the disclosed embodiments without departing from the subject and spirit of the invention as defined by the following claims.

What is claimed is:

1. For use in a phase-shift time-of-flight (TOF) system that emits signals of optical energy and determines distance Z to a target object by detecting and examining relative phase shift in optical energy signals reflected from the target object and detected by an array of pixel photodetectors, a method to assign a measure of confidence to output signals detected by said photodetectors, the method including the following steps:

(a) acquiring during a time frame from said photodetectors active brightness data and total brightness data;
    (b) storing a priori-determined at least one of upper and lower detectable levels of optical energy for at least some of said photodetectors;
    (c) comparing levels stored at step (b) with presently generated output signals from said at least some photodetectors to identify which, if any, of said photodetectors is presently operating other than in an acceptable dynamic range; and
    (d) characterizing Z depth information obtained by output from said at least some detectors as being at least one of questionable confidence and acceptable confidence.

2. The method of claim 1, further including: (e) indicating to a user of said TOF system when questionable confidence data is being acquired.

3. The method of claim 1, wherein an active brightness signal for said pixel photodetectors, when operating within an acceptable dynamic range, is given by:

$$\text{Signal} = \text{Active\_Brightness} = \sqrt{(\Delta 0° - \Delta 180°)^2 + (\Delta 90° - \Delta 270°)^2}$$

where said TOF system acquires data at least at phases of 0°, 189°, 90°, and 270°.

4. The method of claim 1, wherein a signal/noise ratio of zero and a confidence level of zero is assigned to any of said photodetectors determined to be operating other than within an acceptable dynamic range.

5. The method of claim 1, wherein step (c) is carried out using at least one brightness-based threshold filter.

6. The method of claim 1, wherein step (c) is carried out in at least one of hardware and software.

7. The method of claim 1, wherein step (e) includes displaying a user-viewable image, which image indicates low confidence data are used in creating said image.

8. The method of claim 1, wherein step (e) includes generating a user-detectable acoustic signal indicating low confidence data are presently being used.

9. The method of claim 1, wherein step (b) includes storing levels associated with at least one system environmental parameter selected from a group consisting of system temperature, system operating potential, system altitude, and system pressure.

10. The method of claim 1, wherein at least one of step (c) and step (d) are carried out by a microprocessor associated with said TOF system executing software stored in memory associated with said TOF system.

11. For use in a phase-shift time-of-flight (TOF) system that emits signals of optical energy and determines distance Z to a target object by detecting and examining relative phase shift in optical energy signals reflected from the target object and detected by an array of pixel photodetectors, said TOF system acquiring active brightness data and total brightness data, a confidence system to assign a measure of confidence to output signals detected by said photodetectors, the confidence system comprising:

memory to store a priori-determined at least one of upper and lower detectable levels of optical energy for at least some of said photodetectors;
    means for comparing at least some of said stored said upper and lower detectable levels with presently generated output signals from said at least some photodetectors to identify which, if any, of said photodetectors is presently operating other than in an acceptable dynamic range; and
    means for characterizing Z depth information obtained by output from said at least some detectors as being at least one of questionable confidence and acceptable confidence.

12. The confidence system of claim 11, further including means for indicating to a user of said TOF system when questionable confidence data is being acquired.

13. The confidence system of claim 12, wherein said means for indicating includes at least one of displaying a user-viewable image, which image indicates low confidence data are used in creating said image, and generating a user-detectable acoustic signal indicating low confidence data are presently being used.

14. The confidence system of claim 12, wherein said memory stores levels associated with at least one system environmental parameter selected from a group consisting of system temperature, system operating potential, system altitude, and system pressure.

15. The confidence system of claim 11, wherein an active brightness signal for said pixel photodetectors, when operating within an acceptable dynamic range, is given by:

$$\text{Signal} = \text{Active\_Brightness} = \sqrt{(\Delta 0° - \Delta 180°)^2 + (\Delta 90° - \Delta 270°)^2}$$

where said TOF system acquires data at least at phases of 0°, 189°, 90°, and 270°.

16. The confidence system of claim 11, wherein a signal/noise ratio of zero and a confidence level of zero is assigned to any of said photodetectors determined to be operating other than within an acceptable dynamic range.

17. The confidence system of claim 11, further including software, storable in memory in said TOE system, that when executed implements at least one of said means for comparing and said means for characterizing.

18. The confidence system of claim 17, wherein said software is executable by a processor in said TOF system.

19. A phase-shift time-of-flight (TOF) system that emits signals of optical energy and determines distance Z to a target object by detecting and examining relative phase shift in optical energy signals reflected from the target object and detected by an array of pixel photodetectors wherein said TOF system acquires active brightness data and total brightness data, said TOF system further including:
  a confidence system to assign a measure of confidence to output signals detected by said photodetectors, the confidence system comprising:
  memory to store a priori-determined at least one of upper and lower detectable levels of optical energy for at least some of said photodetectors;
  means for comparing at least some of said stored said upper and lower detectable levels with presently generated output signals from said at least some photodetectors to identify which, if any, of said photodetectors is presently operating other than in an acceptable dynamic range; and
  means for characterizing Z depth information obtained by output from said at least some detectors as being at least one of questionable confidence and acceptable confidence.

20. The TOF system of claim 19, further including means for indicating to a user of said TOF system when questionable confidence data is being acquired.

* * * * *